(12) United States Patent
Tuerk

(10) Patent No.: US 6,793,273 B1
(45) Date of Patent: Sep. 21, 2004

(54) BULKHEAD EXTENSION FOR CARGO TRUCK

(75) Inventor: James R. Tuerk, Indianapolis, IN (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

(21) Appl. No.: 10/409,833

(22) Filed: Apr. 9, 2003

(51) Int. Cl.[7] .............................. B60J 7/22; B62D 35/00
(52) U.S. Cl. ................................ 296/186.1; 296/180.1; 296/180.4
(58) Field of Search ........................... 296/186.1, 180.1, 296/180.4, 105, 100.12; 180/903

(56) References Cited

U.S. PATENT DOCUMENTS

| | | | |
|---|---|---|---|
| 3,433,470 A | * | 3/1969 | Erke ........................ 296/182.1 |
| 3,934,922 A | | 1/1976 | MacCready, Jr. et al. |
| 4,342,480 A | | 8/1982 | Ross, Jr. |
| 4,902,064 A | | 2/1990 | Tuerk et al. |
| 5,536,062 A | | 7/1996 | Spears |
| 5,538,313 A | | 7/1996 | Henning |
| 6,010,176 A | | 1/2000 | Jones |
| 6,065,796 A | | 5/2000 | Verduyn |
| 6,183,036 B1 | | 2/2001 | Coulson |
| 6,196,786 B1 | * | 3/2001 | Shinohara ................... 414/498 |
| 6,224,141 B1 | | 5/2001 | Brodlo |
| 6,312,040 B1 | * | 11/2001 | Shinohara .............. 296/100.12 |
| 6,419,301 B1 | | 7/2002 | Tuerk |

FOREIGN PATENT DOCUMENTS

| | | |
|---|---|---|
| GB | 2 186 532 | 8/1997 |

OTHER PUBLICATIONS

U.S. Dept. of Transportation, "Federal Motor Carrier Safety Administration", Regulations, Mar. 2, 2001.
Aero Industries, Inc., "Flatbed Accessories", (Jan. 20, 1999).

* cited by examiner

Primary Examiner—D. Glenn Dayoan
Assistant Examiner—Greg Blankenship
(74) Attorney, Agent, or Firm—Maginot, Moore & Beck

(57) ABSTRACT

In one embodiment, a bulkhead extension for a DOT rated bulkhead installed on a flatbed vehicle includes a pair of wings attached one to each side of the bulkhead. The bulkhead extension also includes a top bar coinciding with the top panel of the bulkhead and connected between the pair of wings to provide a unitary bulkhead extension. The bulkhead extension widens the bulkhead to accommodate an extendable/retractable flexible cover system mounted on the bed of the vehicle. In another embodiment, the extension apparatus is mounted inboard of the vertical legs of the front bow-shaped beam of the cover system. In this embodiment, the extension apparatus can include a pair of wings or swing flaps that are pivotably mounted to the vertical legs so that the wings can be pivoted between an outboard position and an inboard operative position.

20 Claims, 5 Drawing Sheets

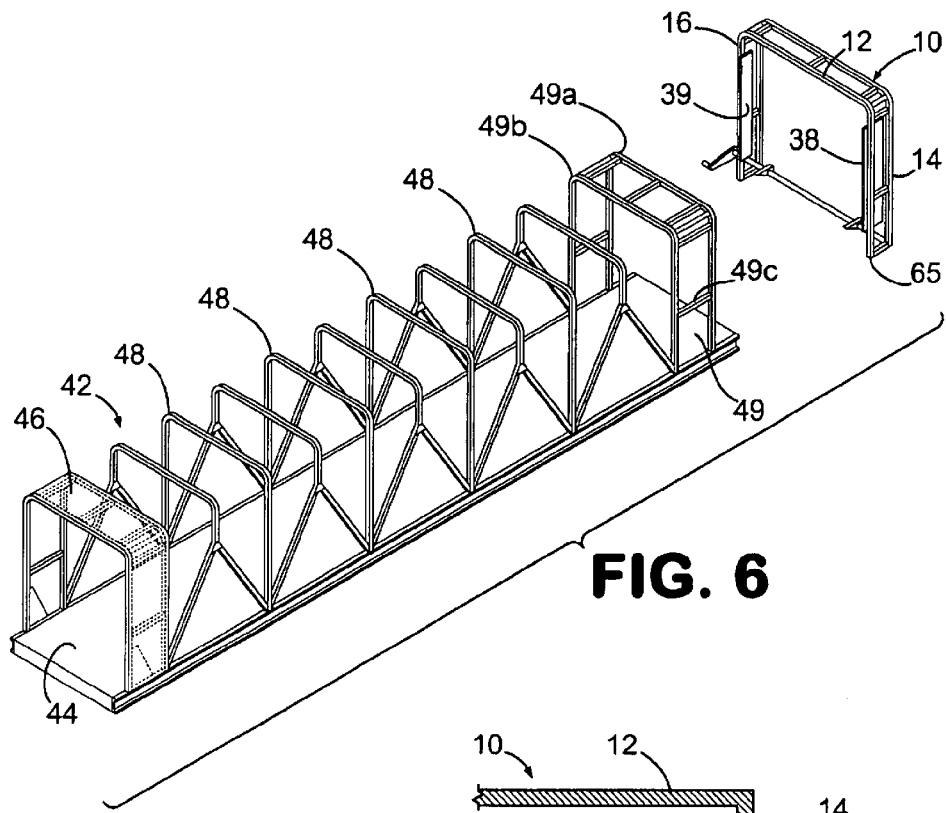
FIG. 6
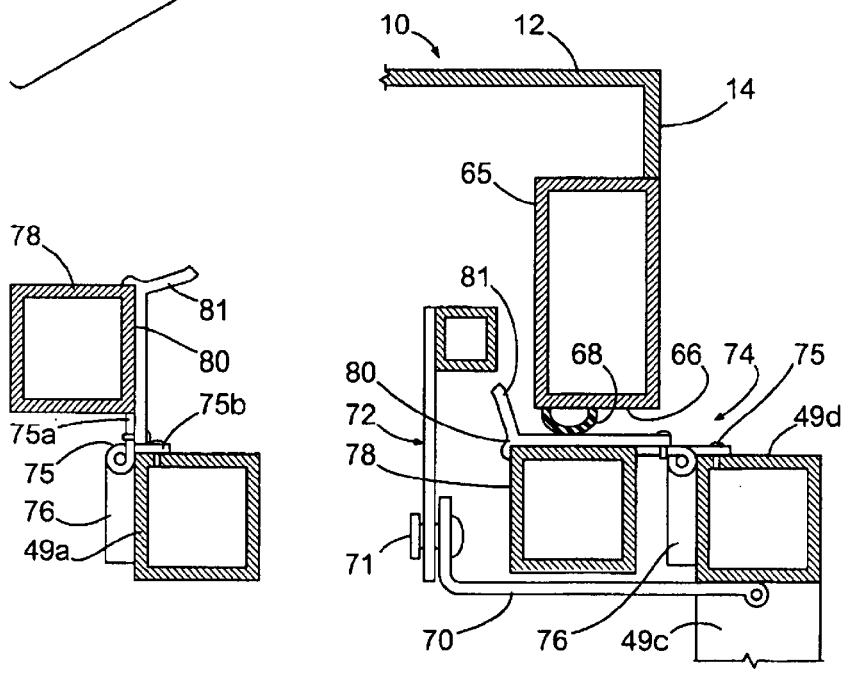
FIG. 8  FIG. 7

BULKHEAD EXTENSION FOR CARGO TRUCK

BACKGROUND OF THE INVENTION

This invention relates to an apparatus for increasing the width of a bulkhead of a flat bed vehicle. In particular, the invention facilitates adapting a bulkhead for use with a flexible tarp cover system for the vehicle bed.

Flat bed trailers are used to haul a variety of goods ranging from large heavy articles such as machinery to palletized goods. It is desirable, particularly with regard to weather sensitive goods, to provide a cover to protect a load during transit. Various types of cover systems have been used ranging from simple tarps held in place with cargo straps and tie downs to retractable tarp systems that cover and protect the entire trailer bed from weather and debris.

One such retractable tarp system is the Conestoga® tarp cover system manufactured and sold by Aero Industries of Indianapolis, Ind. Details of this type of cover system are disclosed in the U.S. Pat. No. 4,711,484, issued on Dec. 8, 1987, and U.S. Pat. No. 4,902,064, both of which are owned by the assignee of the present invention. The Conestoga® tarp system was developed to provide a tarp cover system that effectively protects not only the cargo area but also protects or seals the tarp cover deployment system. The Conestoga® system includes a wheel and track deployment system that rides along the outside edges of the trailer. In this manner, the entire trailer bed is under cover.

This type of tarping system typically requires that the trailer bulkheads be slightly wider than the trailer bed to provide an effective seal between the cover system and the bulkhead. This presents a problem with Department of Transportation rated bulkheads having a width restricted by Department of Transportation regulation 393.106(c) which provides in part that "The front end structure must have a width which is at least equal to the width of the vehicle or which blocks forward movement of any cargo item being transported on the vehicle, whichever is narrower". The front bulkheads provide protection to the vehicle cab and driver against shifting loads within the trailer, hence the width regulation for the bulkhead.

Accordingly, a need exists for an apparatus, which allows use of DOT-rated bulkheads with vehicle tarping systems, such as those described in the aforementioned patents.

SUMMARY OF THE INVENTION

This problem was addressed by a prior invention of the present applicant disclosed in U.S. Pat. No. 6,419,301, which issued on Jul. 16, 2002. In general, this invention provides a bulkhead extension that included a pair of wings attached one to each side of the bulkhead. The bulkhead extension includes a compressible seal disposed between the wings and the sidewall of the bulkhead, along with a plurality of fasteners for attaching the bulkhead extension to the bulkhead.

In one preferred embodiment of the invention of the '301 Patent, each wing includes a vertical member, which is attached to the side panel of the bulkhead, and an upper member which extends from the top of the vertical member. The upper member is attached to the corner of the top panel which may be curved or rounded. The upper member has a lower leg that telescopes into the vertical member to provide adjustment for varying bulkhead heights.

The present invention represents an improvement to the bulkhead extension of the '301 Patent. In a preferred embodiment of this invention, the bulkhead extension comprises a bulkhead extension that is configured to span substantially the entire perimeter of the side of the bulkhead facing the flexible cover system. In particular, the bulkhead extension includes a pair of opposite extension plates configured to mate the corresponding side panels of the bulkhead. The extension plates are connected across the top of the bulkhead by a top bar. The bulkhead extension can include a seal that travels around the perimeter of the bulkhead extension and against which bears the front support bow of the cover system.

In another embodiment of the present invention, the bulkhead extension is configured to be carried by the front support bow of the cover system, rather than by the bulkhead itself. In one feature of this embodiment, a pair of wings or swing flaps is configured to be mounted to opposite sides of the front support bow. Each swing flap is mounted to a corresponding side of the front support bow so the swing flap can be pivoted between and inboard and an outboard position. In the inboard position, the swing flap provides a sealing surface for sealing engagement with the side panel of the bulkhead. In the outboard position, the swing flap is clear of the interior of the cover system so as not to impede the loading of cargo into the trailer.

The present invention accomplishes one objective of providing an apparatus which when attached to a DOT-rated bulkhead provides for the installation of a flexible cover system thus allowing the truck be to be sealed from inclement weather and road debris. This and other objects, advantages, and benefits are accomplished according to the devices of the following descriptions of the preferred embodiments of the present invention.

DESCRIPTION OF THE FIGURES

FIG. 6 is a perspective view of the components of a flexible cover system, such as the Conestoga® cover system.

FIG. 7 is a top cross-sectional view of a bulkhead extension apparatus according to a further embodiment of the invention shown mounted to the front bow section of the cover system shown in FIG. 6.

FIG. 8 is an enlarged view of the bulkhead extension apparatus shown in FIG. 7.

DESCRIPTION OF THE PREFERRED EMBODIMENTS

Figure 1:
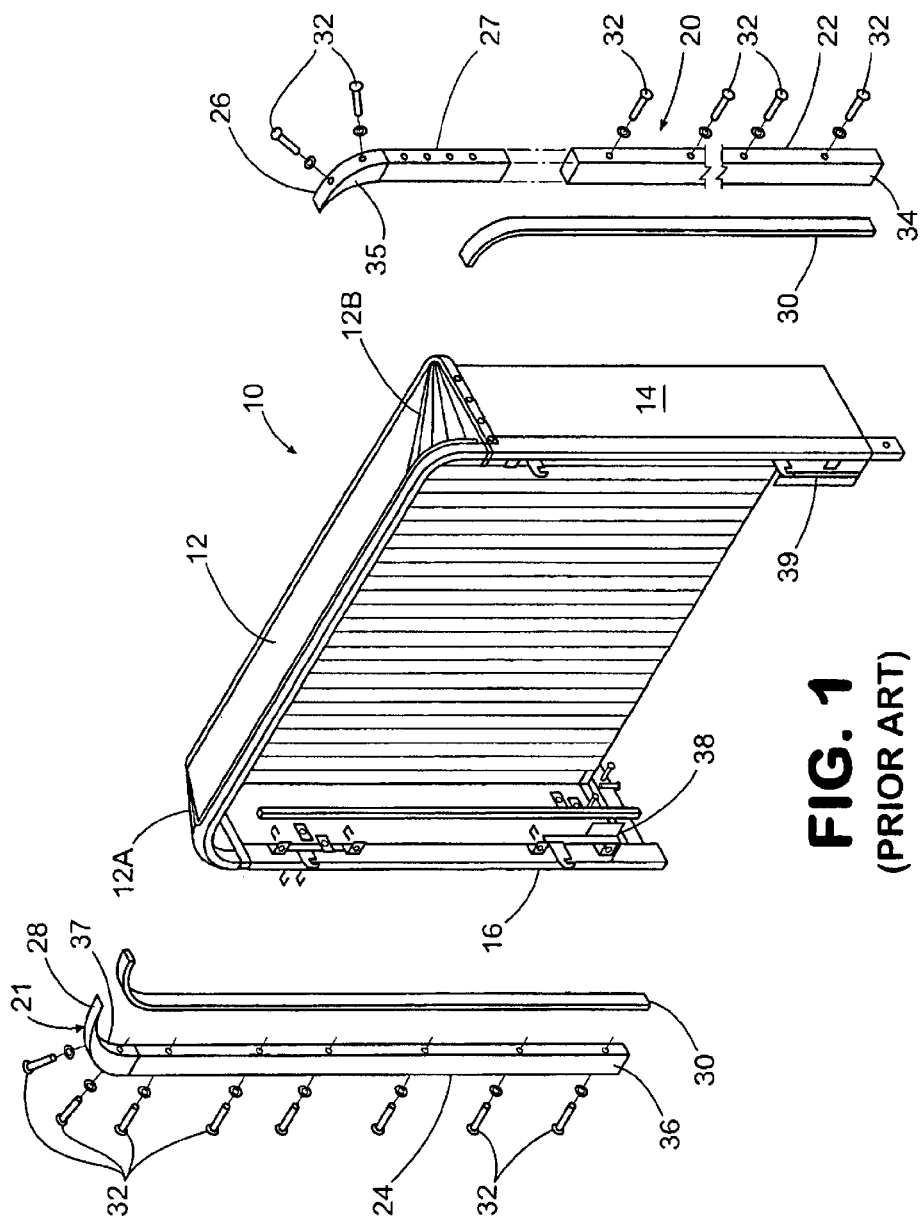
FIG. 1 is an exploded rear perspective view of a bulkhead and bulkhead extension apparatus according to an embodiment described in U.S. Pat. No. 6,419,301.

For the purposes of promoting an understanding of the principles of the invention, reference will now be made to the embodiments illustrated in the drawings and specific language will be used to describe the same. It will nevertheless be understood that no limitation of the scope of the invention is thereby intended. The inventions includes any alterations and further modifications in the illustrated devices and described methods and further applications of the principles of the invention which would normally occur to one skilled in the art to which the invention relates.

Figure 2:
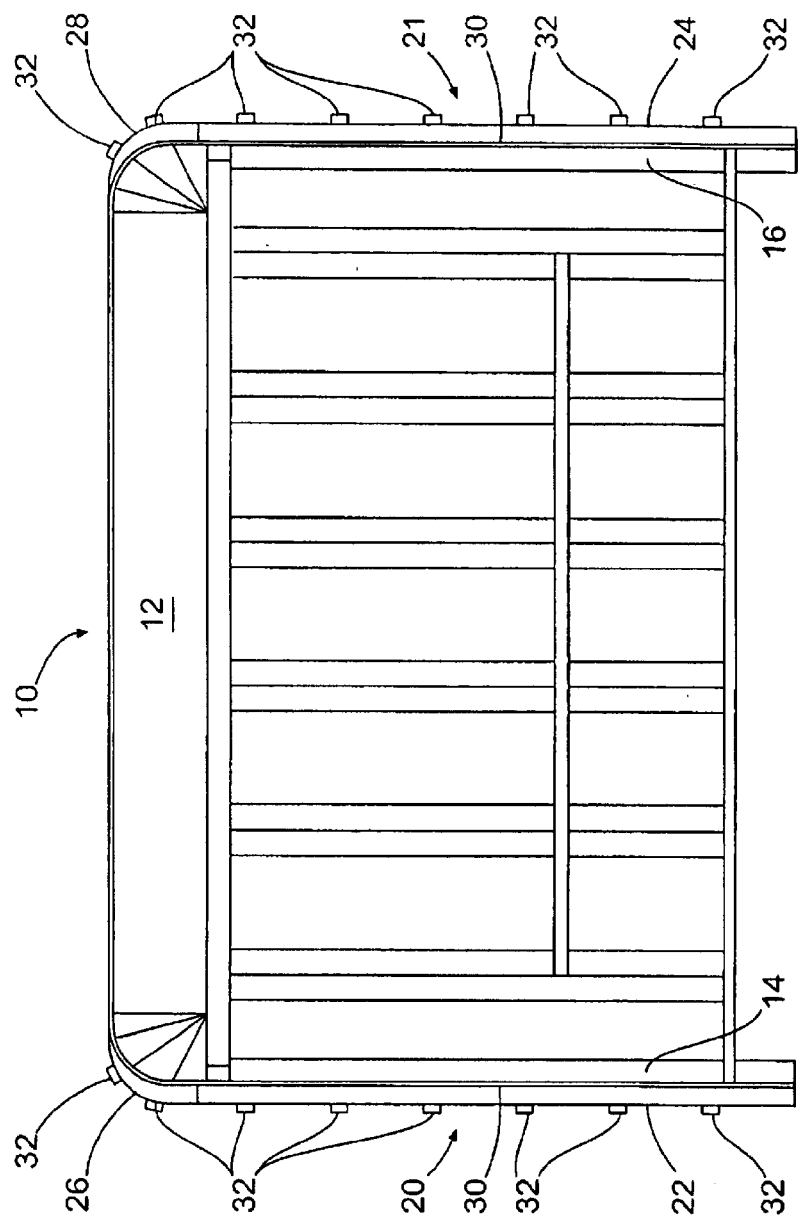
FIG. 2 is a front view of the bulkhead of FIG. 1 with bulkhead extension mounted thereon.
Figure 3:
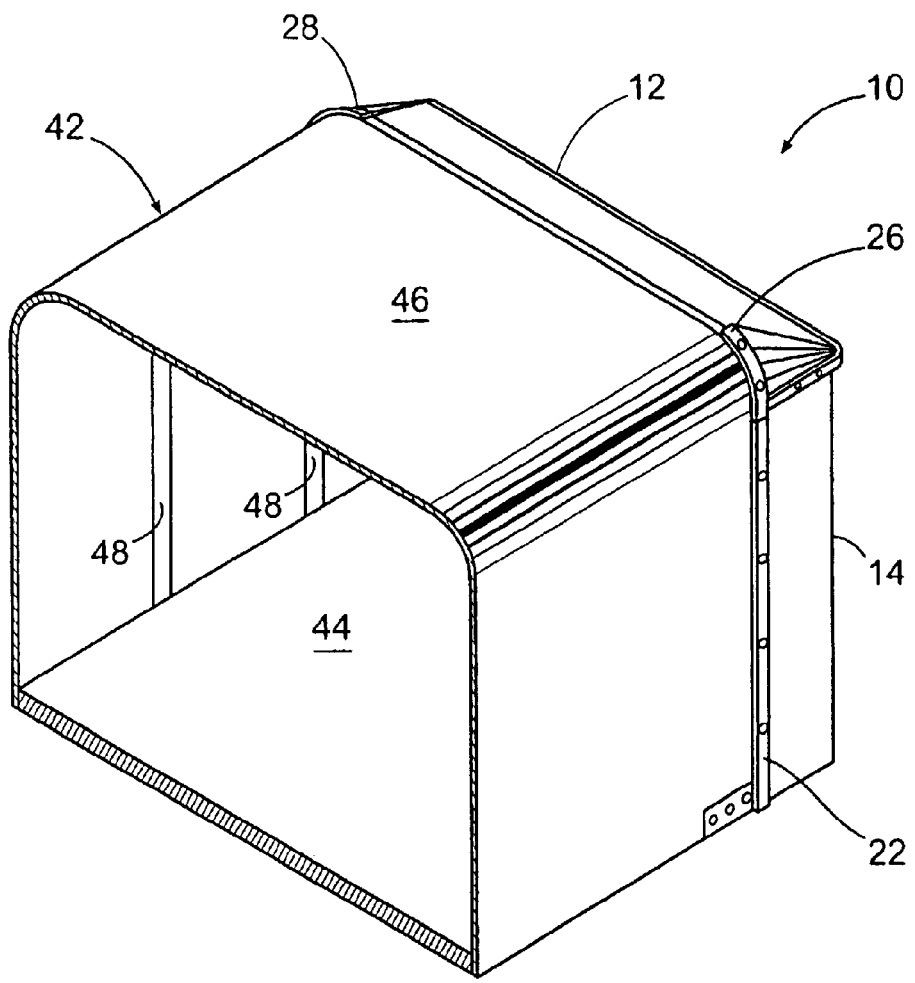
FIG. 3 is a rear perspective showing a partial flat truck bed with a Conestoga® tarp cover installed using the bulkhead extension shown in FIGS. 1 and 2.

The bulkhead extension disclosed in U.S. Pat. No. 6,419,301 is shown in FIGS. 1–3 for reference. In particular, a bulkhead 10 is shown which is suitable to be mounted on a flat bed trailer, preferably at the forward end of the trailer. The bulkhead 10 includes left and right side panels 16 and 14, respectively, and a top panel 12. The top panel 12, which spans the width of bulkhead 10, preferably includes rounded ends 12A and 12B, which adjoin the upper ends of side panels 14 and 16. The bulkhead 10 can also includes latch mechanisms 38 and 39, which are used to attach a tarp cover system to the bulkhead 10. The tarp system can be an extendable cover system such as the Conestoga® system described above, a portion of which is depicted in FIG. 3. Several bulkheads are available for use with the Conestoga® tarp system with varying heights, side panel dimensions and front profiles.

The bulkhead 10 can be configured to protect the truck cab and its occupants from forward shifting of the cargo being hauled. The U.S. Department of Transportation has promulgated regulations that control the structure of bulkheads that are intended to withstand impacts from shifting loads. More specifically a DOT-rated bulkhead is subject to certain dimensional restrictions. In one regulation, the width of the rated bulkhead is not allowed to exceed the width of the trailer. This regulated limitation can present a problem when it is desired to use bulkhead 10 with an extendable tarp cover system, such as the Conestoga® system, which has a deployment mechanism that is mounted along the outer side rails of the trailer. This cover system is slightly wider than the trailer bed and therefore wider than a DOT-rated bulkhead.

To surmount this problem, the bulkhead extension of the '301 Patent marries this type of extendable tarp cover system to a rated bulkhead. The bulkhead extension assembly shown in FIG. 1 includes right side and left side wing assemblies 20 and 21, respectively. The wing assemblies 20 and 21 attach to the right and left side panels 14 and 16, respectively, and also to the ends 12A and 12B of the top panel 12. By way of example, the wing 20 includes a vertically upstanding member 22 which attaches to side panel 14 and an upper member 26, which extends from vertical member 22 and which attaches to the rounded end 12B of top panel 12. The attachment of the wings 20 and 21 to the bulkhead 10 can be accomplished with suitable fasteners 32, such as nuts and bolts, passing through pre-drilled holes in the side panels. Compressible seals 30 are applied between the bulkhead 10 and the bulkhead extension wings 20 and 21 and extend the full length of wings 20 and 21 so that the covered area of the truck bed is sealed from weather and road debris. The seals 30 may be of any suitable compressible material such as rubber or foam rubber.

In FIG. 2, bulkhead 10 is depicted with the bulkhead extension wings 21 and 22 installed to effectively extend the width of bulkhead 10. The wings 20 and 21 thus provide an extended mating surface for the extendable cover system 42 (FIG. 3) without compromising the bulkhead 10 and its DOT rating. The wings 20 and 21 provide sealing surfaces 34, 35, 36 and 37, respectively, against which bow support members 48 of the flexible tarp cover can abut to seal the cargo area. FIG. 3 shows a partial view of a flat bed trailer with a DOT-rated bulkhead, a bulkhead extension according to the present invention and a Conestoga® type flexible tarp cover installed. The front end of the trailer is shown with bulkhead 10 mounted at the forward end of the truck or trailer bed 44. The bulkhead extension 20 can be removed should it be desired to return the truck to an open flatbed mode.

In other embodiments of the invention of the '301 Patent, the upper wing member may be extended from the vertical wing member to adjust the bulkhead extension for the height of the bulkhead on which it is to be installed more specifically, the curved member 26 can include a linear section 27 that can be telescopically disposed within vertical member 22. The fasteners 32 can fix the curved member at a particular extension height relative to the vertical member. It is also contemplated that the curve member may be replaced with a component of a different contour to match the contour required for the particular bulkhead installation.

Figure 4:
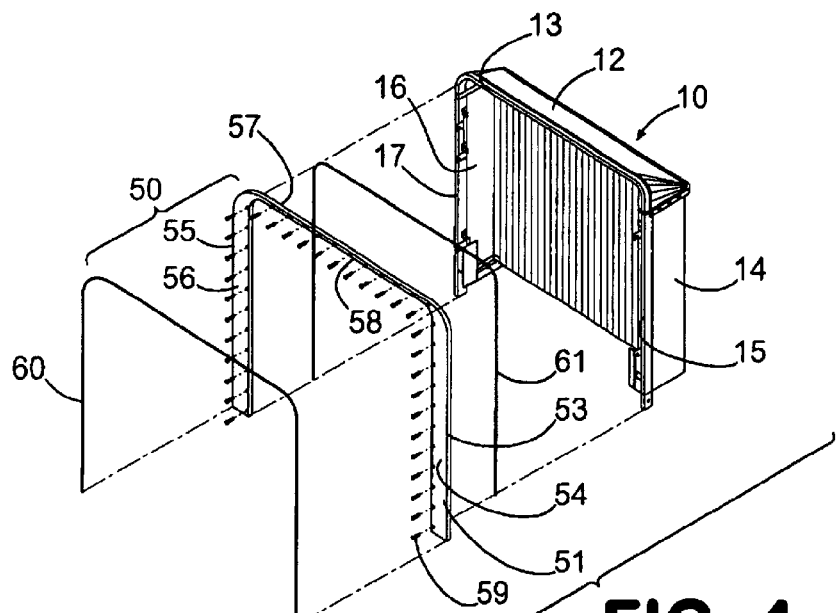
FIG. 4 is an exploded rear perspective view of a bulkhead and bulkhead extension apparatus in accordance with one embodiment of the present invention.

The bulkhead extension 20 of the '301 Patent solved the problem of integrating an extendable cover system, like the Conestoga® system, with a DOT-rated bulkhead. The present invention improves on this technology. In one embodiment of this invention, a bulkhead extension assembly 50 is provided that can be mounted to a bulkhead, such as the bulkhead 10. In one feature of the invention, the bulkhead extension assembly 50 essentially combines the left and right extension wings into a single piece extension plate 51. For instance, as shown in FIG. 4, the extension plate 51 includes a right extension wing 53 and a left extension wing 55 connected by a top bar 57.

Figure 5:
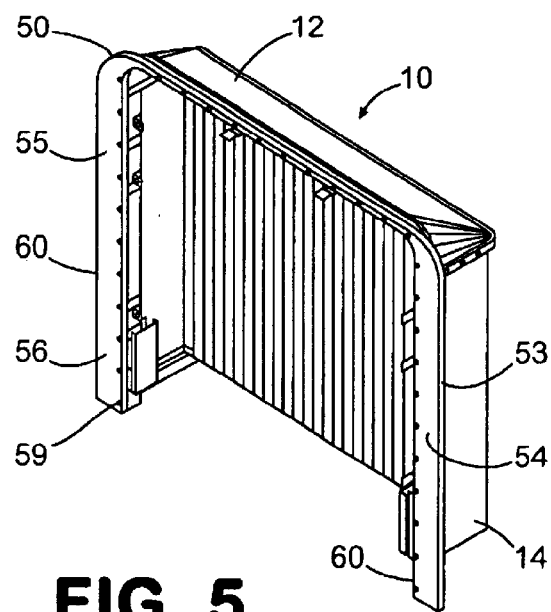
FIG. 5 is a front perspective view of the bulkhead extension apparatus shown in FIG. 4 mounted on the bulkhead.

The right and left extension wings 53, 55 are configured to coincide with the corresponding right and left side panels 14, 16 of the bulkhead, as shown in FIG. 5. Similarly, the top bar 57 corresponds to the top panel 12 of the bulkhead 10. More specifically, the top, right, and left edges 13, 15 and 17 of the bulkhead contact an inboard portion of the front face (opposite the surfaces 54, 56 and 58) of the extension plate 51. In accordance with one aspect of the invention, the right and left extension wings 53, 55 have a width greater than the width of the corresponding right and left edges 15, 17 of the bulkhead so the wings project laterally outward form the bulkhead. In the preferred embodiment, the top bar 57 is co-extensive with the top edge 13 of the bulkhead, meaning that the top bar does not project outwardly or upwardly away from the top edge. In one typical installation, the extendable cover system has a height that equals the height of the bulkhead, so no top extension is required. However, if the extendable cover system has a height greater than the height of the bulkhead, the top bar 57 can be configured like the right and left extension wings to extend away from bulkhead top edge, thereby providing a vertical extension feature for the bulkhead.

The extension plate defines aft facing surfaces 54, 56 and 58 that operate as sealing surfaces when contacted by the front end of an extendable cover system. In a preferred embodiment, the facing surfaces define a series of openings (not shown) to receive a plurality of fasteners 59 therethrough. The fasteners 59 are used to mount the extension plate 51 to the bulkhead, preferably engaging mating bores (not shown) defined in the panel edges 13, 15, 17. In a most preferred embodiment, the fasteners 59 are bolts or screws and the mating bores in the bulkhead are configured accordingly. In this way, the bulkhead extension assembly 50 can be removed as necessary for repair, replacement or the like. Alternatively, the bulkhead extension assembly can be affixed to the bulkhead as a permanent retrofit, such as by riveting or welding the extension plates and top bar to the bulkhead. In a preferred embodiment, a seal or gasket 61 can be provided between the extension plate 51 and the bulkhead 10 to seal the engagement between these components.

The bulkhead extension assembly 50 can also include a seal 60 that is configured to span the perimeter of the extension plate 51. Preferably, the seal is mounted to the sealing surfaces 54, 56, 58. In one specific embodiment, the seal 60 can be in the form of a compressible seal affixed to the surfaces by epoxy or glue. The seal can take on other forms suitable for providing a substantially weather-tight seal between the bulkhead extension assembly 50 and the extendable cover assembly. Moreover, the seal can be engaged to the extension plate 51 in a variety of manners dictated by the form of the seal. For instance, the seal can be mounted in a groove defined in the surfaces 54, 56, 58, or can be mounted to the extension plate by separate fasteners. Moreover, while the seal is preferably one piece, as shown in FIG. 4, it can be provided in multiple segments. The seal 60 in certain embodiments can be removable from the extension plate so that the seal can be replaced when becomes worn or is damaged.

As shown in FIG. 5, the seal 60 is preferably disposed at the outer perimeter of the right and left wings and the top bar. It is important that the seal be situated for optimum sealing contact with the corresponding components of the extendable cover assembly, such as a bow support member 48 shown in FIG. 3. In the illustrated embodiment, the seal 60 can be in the form of a small diameter ring segment (such as the seal 68 shown in FIG. 7). Alternatively, the seal can be in the form of a wide strip, like the seal 30 shown in FIG. 1, in which the strip essentially spans the entire lateral width of the sealing surfaces 54, 56, 58. With this approach, the seal can be a compressible foam material that is substantially similar in configuration to the extension plate 51. The seal formed in this manner can be used to cover the fasteners 59 and to provide a wide sealing surface for the mating components of the extendable cover system. It should also be understood that the seal 60 can be carried by the extendable cover system, rather than the bulkhead extension 50.

In the preferred embodiment, the extension plate 51 is a one-piece plate, as shown in FIG. 4. In an alternative embodiment, the extension plate 51 can be provided in multiple pieces. For instance, the top bar 57 can be configured for telescoping engagement with the upper ends of wing extension plates 53, 55. This telescoping engagement can provide for vertical height adjustment in a manner similar to the adjustment capability of the bulkhead extension apparatus 20 shown in FIG. 1. In this alternative embodiment, the upper curved section 26 of the apparatus 20 can be extended horizontally and contiguous with the top panel 12 of the bulkhead. The curved section would not taper to conform to the outer shape of the bulkhead but would instead have a generally constant dimension for attachment to the top edge 13 of the top panel 12.

Another embodiment of the invention is depicted in FIG. 7. This bulkhead extension assembly 74 is mounted to the extendable cover system, rather than to the bulkhead, as with the prior embodiments. Details on one type of extendable/retractable cover system are shown in FIG. 6. This system is shown and described in more detail in U.S. Pat. No. 5,538,313, which issued on Jul. 23, 1996, and is owned by the assignee of the present invention. The specification of the '313 Patent is incorporated herein by reference. This cover system 42 includes a series of interconnected bow members 48 that are used to support the flexible cover or tarpaulin 46. The cover system includes a front bow section 49 that is formed by a front beam 49a and a rear beam 49b connected by a series of horizontal beams 49c. In the installation shown in the '313 Patent, the front beam 49a engages a rear beam 65 of the bulkhead. The front bow section 49 includes latch components for mating with the latch mechanisms 38, 39 on the bulkhead. Preferably, the front beams 49a include substantially vertical legs that follow the contour of the bulkhead.

Details of the bulkhead extension assembly 74 are shown in FIG. 7. This figure depicts only the right side of the bulkhead 10, which includes the right side panel 14. The bulkhead includes a bulkhead beam 65, shown in top cross-section in the figure, which follows the perimeter of the bulkhead from the right side, across the top and to the left side of the bulkhead (as shown in FIG. 1). In a typical bulkhead construction, this beam 65 is an aluminum tube, and can have a dimension of 2" by 4". In the illustrate embodiment, a seal 68 is mounted on the sealing surface 66 of the beam 65. The seal 68 can be similar to the seal 60 described above, or can adopt a variety of configurations compatible for sealing engagement with the swing flap 80 described herein.

The front beam 49a and a horizontal beam 49c of the front bow section 49 are also depicted in top cross-section in FIG. 7. As explained above, the front bow section includes latching components for engaging the latches 38, 39 of the bulkhead. Thus, a latch striker plate 70 is mounted to the rear side of the front beam 49a, extending into the cargo space. The striker plate 70 is preferably pivotably mounted to the beam so that the latch mechanism can be pivoted to the side of the cover assembly when necessary.

The latch striker plate 70 rotatably supports a latch plate 72 at a pivot 71 so that the latch can be pivoted upward into and out of engagement with the corresponding latch components 38 on the bulkhead 10. Details of the latch construction can be found in the '484 and '064 Patents discussed above, but are not essential to the present invention. It should be understood that the latch components 70–72 do not extend along the entire height of the front bow section, but instead are discrete components of limited vertical dimension. However, the latching components between the bulkhead and the front bow section 49 can impose constraints on the bulkhead extension assembly 74, which extends along the entire height of the bulkhead and bow section, as discussed herein.

In accordance with a preferred embodiment of the invention, the extension assembly 74, shown in FIGS. 7–8, includes a pair of wings or swing flaps 80 that are pivotably connected to the front beam 49a on corresponding sides of the front bow section 49. In the illustrated embodiment, the swing flap 80 is fastened to one leg 75a of a hinge mechanism 75. The other leg 75b of the hinge mechanism 75 is fastened to the front beam 49a. The hinge 75 and the swing flap 80 extend for substantially the full height of the front beam 49a of the front bow section.

The hinge 75 is configured to allow the swing flap 80 to pivot from the inboard sealing position shown in FIG. 7 to the outboard position shown in FIG. 8. When the swing flap is in the outboard position shown in FIG. 8, the flap 80 is clear of the cargo space inside the front bow section. Cargo is typically loaded as efficiently as possible to fill a particular truck or trailer. Thus, a typical practice is to push the cargo as far forward as possible on the truck bed 44 (FIG. 6). When the cargo is being loaded, the extendable cover system 42 is usually not latched to the bulkhead. Thus, the bulkhead extension apparatus 74 can be moved out of the way of any cargo passing through the front bow section 49 when it is loaded at the front of the truck bed 44. In other words, the swing flap 80 can be pivoted to the outboard position shown in FIG. 8 so that it will not interfere with cargo being loaded into the trailer.

Once the cargo is fully loaded, the cover system 42 can be extended and latched to the bulkhead in a known manner. At this time, the swing flap 80 is pivoted to its inboard position shown in FIG. 7 so the arm can engage the bulkhead beam 65. It can be appreciated that the swing flap 80 itself does not extend the width of the bulkhead. Instead, the swing flap 80 provides an interface between the bulkhead and the front beam 49b of the cover system 42, which is inherently wider than the bulkhead. As can be discerned from FIG. 7, in the absence of the bulkhead extension apparatus 74, the front beam 49a would never engage the bulkhead beam 65 or provide a sealed engagement.

The swing flap 80 is attached to the hinge portion 75a, such as by rivets, screws or the like. Similarly, the opposite portion 75b of the hinge can be connected to the beam 49a by rivets, screws or the like. The swing flap 80 contacts the seal 68 when the extension apparatus 74 is in its operative position shown in FIG. 7. In the preferred embodiment, the swing flap 80 is formed from a metal sheet, such as aluminum. However, the flap can be formed of other material suitable to provide a substantially weather-tight contact against the seal 68. The swing flap 80 can be provided with an inward flange 81 that provides an additional weather barrier inboard of the seal 68. As an alternative embodiment, the swing flap 80 can be modified to include a seal, like the seal 68, mounted thereon. This second seal can be offset from the seal 68 on the bulkhead so that the two seals overlap when the swing flap 80 is in its operative position.

Structural support for the swing flap 80 can be provided by a beam 78 that extends along the vertical extent of the flap. The beam 79 can help provide rigidity to the swing flap, especially if the flap is formed of a more flexible material than the preferred aluminum. Structural support for the hinge can be provided by a hinge support 76 that is affixed to the front beam. The hinge support abuts the pivot point of the hinge but does not interfere with the relative rotation between the hinge arms 75a, 75b. It is desirable to provide as weather-tight as seal as possible between the cover system 42 and the bulkhead 10. Thus, the latch arrangement is configured to pull the front bow section 49 as far forward as possible, thereby compressing the seal 68 against the swing flap 80. This latching arrangement loads the hinge, so the hinge support 76 can be important to prevent the hinge from buckling.

In this embodiment, the bulkhead extension assembly 74 is similar to the bulkhead extension assembly 20 shown in the '301 Patent in that it preferably only extends along the sides of the bulkhead. Since the swing arm 78 pivots outwardly, a one piece plate, such as the extension plate 51 of the prior embodiment, cannot be used. However, the swing arm 78 can be configured to extend along the entire vertical extent of the side walls 14, 16 and partially across the width of the top wall of the bulkhead. Thus, swing arms on both sides of the front bow section 49 can meet at the top of the bow section and bulkhead to fully enclose the cargo space.

It can be appreciated that the embodiment of FIGS. 7–8 is suited for retro-fit mounting on an extendable cover system already mounted on a truck bed. The swing arm and hinge can be readily fastened to front beam 49a of the bow section without requiring any alteration of the bulkhead. It should also be appreciated that the length of the hinge 75 and the size of the swing arm 78 can be modified as necessary to fit a particular bulkhead.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. For a flatbed vehicle having a DOT-rated bulkhead including a top panel and opposite side panels, an apparatus for extending the width of the bulkhead for installation of a flexible cover system to cover the bed of the vehicle when the flexible cover is deployed, said apparatus comprising:

a pair of wings attachable one to each of the opposite side panels of the bulkhead to widen the bulkhead, said pair of wings provided in a one-piece structure; and means for attachment of each of said pair of wings to the bulkhead.

2. The apparatus of claim 1, wherein each of said pair of wings defines a rearward facing sealing surface for engagement with the flexible cover system.

3. The apparatus of claim 2, further comprising a seal supported on said sealing surface to provide a seal between said wings and the flexible cover system.

4. The apparatus of claim 1, further comprising a top bar spanning between and integral with said pair of wings.

5. The apparatus of claim 4, wherein each of said pair of wings and said top bar defines a rearward facing sealing surface for engagement with the flexible cover system.

6. The apparatus of claim 5, further comprising a seal supported on said sealing surface to provide a seal between said wings and top bar and the flexible cover system.

7. The apparatus of claim 6, further comprising a seal between said pair of wings and said bulkhead.

8. The apparatus of claim 1 wherein said attachment means includes a plurality of fasteners.

9. For a flatbed vehicle having a DOT-rated bulkhead including a top panel and opposite side panels, an apparatus for extending the width of the bulkhead for installation of a flexible cover system to cover the bed of the vehicle when the flexible cover is deployed, said apparatus comprising:

a pair of wings attachable one to each of the opposite side panels of the bulkhead to widen the bulkhead;

a top bar connected to said pair of wings and attachable to the top panel of the bulkhead; and means for attachment of each of said pair of wings and said top bar to the bulkhead.

10. The apparatus of claim 9, wherein said top bar is integral with said pair of wings.

11. The apparatus of claim 9, wherein each of said pair of wings and said top bar defines a rearward facing sealing surface for engagement with the flexible cover system.

12. The apparatus of claim 11, further comprising a seal supported on said sealing surface to provide a seal between said wings and top bar, and the flexible cover system.

13. The apparatus of claim 12, further comprising a seal between said pair of wings and top bar, and said bulkhead.

14. A bulkhead kit for a flatbed vehicle having a flexible cover system to cover the bed of the vehicle when the flexible cover is deployed, said bulkhead kit comprising:

a DOT-rated bulkhead, including a top panel and opposite side panels; and an extension apparatus for extending the width of the bulkhead, the apparatus including;

a pair of wings attachable one to each of the opposite side panels of the bulkhead to widen the bulkhead;

a top bar connected to said pair of wings and attachable to the top panel of the bulkhead; and means for attachment of each of said pair of wings and said top bar to the bulkhead.

15. The apparatus of claim 14, wherein said top bar is integral with said pair of wings.

16. The apparatus of claim 14, wherein each of said pair of wings and said top bar defines a rearward facing sealing surface for engagement with the flexible cover system.

17. The apparatus of claim 16, further comprising a seal supported on said sealing surface to provide a seal between said wings and top bar, and the flexible cover system.

18. The apparatus of claim 17, further comprising a seal between said pair of wings and top bar, and said bulkhead.

19. For a flatbed vehicle having a DOT-rated bulkhead including a top panel and opposite side panels, and a cover system extendable over the flatbed, the cover system including a front bow section supporting a flexible cover, the front bow section having a front bow-shaped beam facing the bulkhead, in which vertical legs of the front beam are at a width greater than a width of the bulkhead, an apparatus for spanning this width difference comprising:
   a pair of wings, one each connected to a corresponding one of the vertical legs of the front beam inboard of the corresponding leg, each of said pair of wings defining a sealing surface facing the bulkhead; and
   a seal substantially co-extensive with each of said pair of wings and disposed between each of said pair of wings and a corresponding portion of the bulkhead facing the arms.

20. The apparatus of claim 19, wherein each of said pair of wings is pivotably connected to the corresponding vertical leg so that each wing can be pivoted outboard relative to the corresponding vertical leg.

* * * * *